United States Patent

Ikeya et al.

[11] Patent Number: 5,906,294
[45] Date of Patent: May 25, 1999

[54] POWDER SUPPLYING DEVICE UTILIZING AN ULTRASONIC MOTOR

[75] Inventors: Masaki Ikeya; Koichi Suda, both of Oobu, Japan

[73] Assignee: Aisan Kogyo Kabushiki Kaisha, Aichi, Japan

[21] Appl. No.: 08/907,857

[22] Filed: Aug. 8, 1997

[30] Foreign Application Priority Data

Nov. 8, 1996 [JP] Japan .................................. 8-296313

[51] Int. Cl.⁶ ....................................................... B67D 5/08
[52] U.S. Cl. ............................... 222/55; 222/63; 222/200
[58] Field of Search .............................. 222/55, 196, 200, 222/63; 198/771

[56] References Cited

U.S. PATENT DOCUMENTS

| 4,741,460 | 5/1988 | Blain et al. | 222/55 |
| 4,945,957 | 8/1990 | Kardux et al. | 222/196 X |

FOREIGN PATENT DOCUMENTS

| S62-34690 | 2/1987 | Japan . |
| H3-25321 | 2/1991 | Japan . |

*Primary Examiner*—Gregory L. Huson
*Attorney, Agent, or Firm*—Koda & Androlia

[57] ABSTRACT

Noise caused by a mechanical vibration with a vibrator feeder is reduced in a small flow rate powder supplying device. An adverse effect caused by the noise is reduced and a flow rate accuracy is increased. Its responding characteristic is made fast. A powder hopper, a ultrasonic motor, supplying pipes and tube are supported by a supporting member held by a weighing device provided with a weight sensor. A weight signal of a weight sensor is amplified by an amplifier provided with a low pass filter. It is sampled with an A/D converter and converted into a digital value. A flow rate of powder is calculated by a CPU, a motor driving part is controlled and an amplitude of the ultrasonic motor is adjusted in such a way that a flow rate of the powder may become a target value.

2 Claims, 10 Drawing Sheets

POWDER SUPPLYING DEVICE UTILIZING AN ULTRASONIC MOTOR

BACKGROUND OF THE INVENTION

1. Field of the Invention

This invention relates to an improvement of a powder supplying device.

2. Description of the Related Art

It is well known as shown in Japanese Patent Laid-Open No. Hei 3-25321 to provide a loss-in-weight type powder supplying device in which a powder hopper (a storing tank) is supported by a weighing device, a flow rate of powder supplied by a vibratory feeder fixed to the powder hopper is calculated with reference to a reducing amount of weight of the powder hopper per hour measured by a weight sensor of the weighing device and then a supplying flow rate of the powder is feed-back controlled to a target value.

In a prior art powder supplying device in which specified flow rate is required, a vibration of an electromagnetic feeder is feed-back controlled in response to weight data obtained by high speed sampling and then a high level or a low level of vibration of the electromagnetic feeder is controlled in such a way that it becomes a set flow rate acting as a target value.

In addition, as another prior art, it is well known in a manufacturing stage for an engine valve for an automobile to perform overlaying with a laser clad. The laser clad machining operation is a method for supplying metallic powder to a laser radiating part to make local melting and fixing of different kinds of metals, wherein a gear type rotary feeder has been used as a powder supplying device for performing a continuous supplying of a small amount of overlaying powder to a groove having a narrow circumference of a valve.

In the device for supplying a specified flow rate of powder using the electromagnetic feeder, an analog output signal of a weight sensor is converted by an A/D converter in a control device into a digital value and inputted. This sampling (inputting) frequency is about 100 to 200 Hz. In addition, since the electromagnetic feeder utilized a motion with a frequency of about 100 to 500 Hz under an electromagnetic vibration, there was a problem that a mechanical vibration of this feeder was transmitted to the weight sensor and it was overlapped onto an output signal of the weight sensor as a noise component. As a result this structure was not suitable for a specified flow rate for supplying of a small amount overlaying powder in a manufacturing step for an engine valve which was an application of the prior art.

Although it may be considered to use a low pass filter in order to remove noise, it generates a problem that it is necessary to apply a low pass filter having a cut-off frequency which is sufficiently lower than an electromagnetic vibration of the electromagnetic feeder, resulting in that a response characteristic of the weight sensor is deteriorates and a response characteristic of a flow rate control is lacking.

Then, in the case of the aforesaid prior art (a rotary feeder), there was a problem that its response characteristic was poor and an instantaneous response characteristic was lacking in addition to the problems that a pulsation of flow rate caused by a pitch of a gear was produced or its size was large and the device could not be mounted near a supplying point.

SUMMARY OF THE INVENTION

In view of these facts, it is an object of the present invention to provide a powder supplying device capable of eliminating these problems.

In order to accomplish the aforesaid object, there is provided a powder supplying device comprising the arrangements in which a powder hoppers supplying pipes for guiding powder from said powder hopper, and an ultrasonic motor for applying an elliptical vibration to the powder in the supplying pipes are supported by a weighing device, a flow rate of powder is calculated in reference to a reducing amount of weight per hour measured by a weight sensor of the weighing device, and a driving electric power for the ultrasonic motor is adjusted in such a way that a supplying flow rate of the powder is feed-back controlled to a target value.

In the powder supplying device described above, when different kinds of metals are overlay fused with a laser clad in a manufacturing step for an engine valve of an automobile, the overlaying powder is supplied continuously to a groove at a circumference of the valve.

BRIEF DESCRIPTION OF THE DRAWINGS

FIGS. 4(a) and 4(b) show ultrasonic motor used in the preferred embodiment of the present invention, wherein

DESCRIPTION OF THE PREFERRED EMBODIMENT

Referring now to FIGS. 1 to 13, the preferred embodiment of the present invention will be described as follows.

At first, in FIGS. 1 to 9, a powder hopper 1 is provided with an arm 2a having a weight sensor 45 comprised of a strain gauge type sensor fixed thereto, and this is supported by a supporting member 4 in which its base end (a right side as viewed in the figure) is fixed to an extremity end (a left end as viewed in the figure) of a weighing device 2 fixed to a base block 3.

The ultrasonic motor 5 is constructed such that as shown in the decomposed figure of FIG. 4A, a piezo-electric element 8, divided electrodes 9A, 9B, a piezo-electric element 10 and a ground electrode 11 are held between substantial circular cylindrical aluminum blocks 6 and 7, and both blocks 6 and 7 are connected with a hollow connecting bolt 12.

The connecting bolt 12 is made of electrical conductive metal, both ends of it are applied with male threads and threadably engaged with female threads formed on axes of both blocks 6 and 7.

The divided electrodes 9A and 9B are formed into one plate having a hole 9b at a central part indicated by a reference numeral 9 in FIG. 4(b) at a stage before assembling as the ultrasonic motor 5, and when an assembling is carried out, a connecting bolt 12 passes through this hole 9b with a certain clearance.

Then, after assembling, the portions 9a and 9b in FIG. 4(b) are cut into two segments to form divided electrodes 9A and 9B and at the same time position setting of them when both divided electrodes 9A and 9B are assembled is easily determined.

An electricity supplying terminal 9C is projected at the divided electrode 9A. Additionally, an electricity supplying terminal 11C is also projected at a ground electrode 11.

Additionally, the entire piezo-electric elements 8, 10 and ground electrode 11 are formed in a substantial annular shape and the connecting bolt 12 passes through the central hole with a certain clearance.

Figure 3:
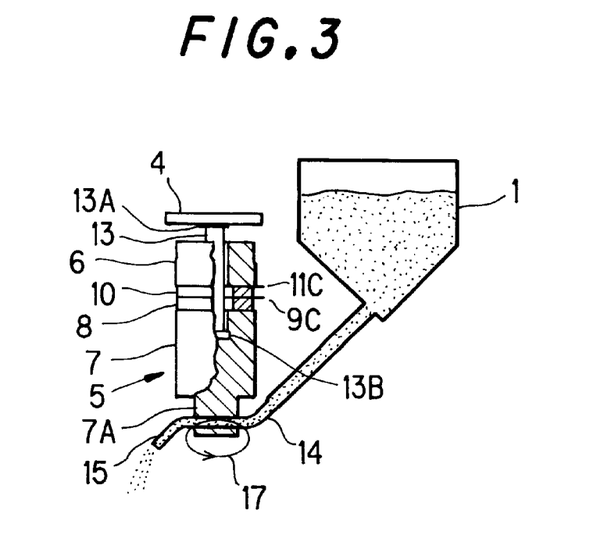
FIG. 3 is a partial longitudinal section for showing a main part in FIG. 2.
Figure 4:
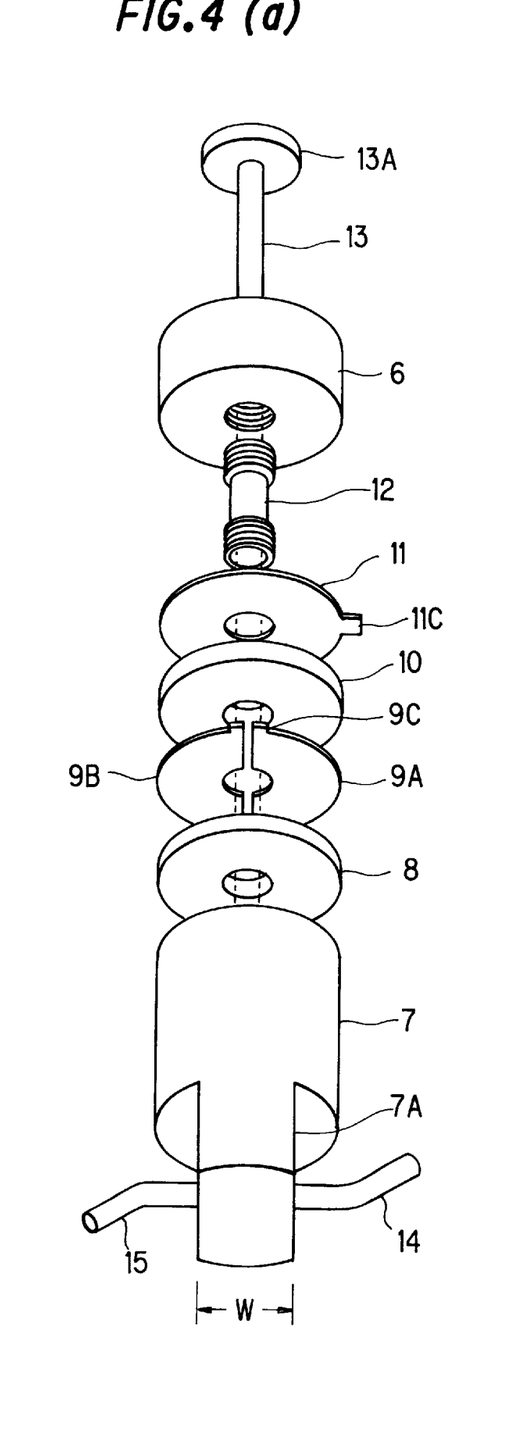
FIG. 4(a) is an exploded perspective view and FIG. 4(b) is a top plan view for showing a shape of a divided electrode before its assembling work.

The supporting shaft 13 has at its upper end a fixing flange 13A integrally formed thereto, a lower end of the supporting shaft 13 passes through a central threaded hole of an aluminum block 6, enters into a hollow part of the connecting bolt 12 and is fixed to a part near the lower end of the connecting bolt 12. Although this fixing part is indicated in FIG. 3 by a reference numeral 13B, the connecting bolt 12 is eliminated in its illustration for a sake of clarity of drawing in FIG. 3. Although the lower end fixing part 13B of the supporting shaft 13 is illustrated as if it is directly fixed to the aluminum block 7, it is fixed to the aluminum block 7 through the connecting bolt 12 actually.

The ultrasonic motor having such a structure as above is operated as an ultrasonic linear motor which is a so-called non-symmetrical bolt fastening Langivan type ultrasonic vibrator. Although an ultrasonic vibrator having a similar structure as above is well known by the ultrasonic vibrator described in the gazette of Japanese Patent Laid-Open No. Hei 7-155687, for example, the ultrasonic vibrator described in this gazette has a certain different point as compared with the ultrasonic motor 5 of the preferred embodiment of the present invention.

An outer diameter of each of both aluminum blocks 6, 7, piezo-electric elements 8, 10, divided electrodes 9A, 9B and a ground electrode 11 of the ultrasonic motor 5 is ø 35 mm, a lower end of the lower aluminum block 7 is set such that a width W in a lateral direction in the figure is recessed to have a substantial half of the aforesaid outer diameter of 35 mm to form a horn part 7A.

The horn part 7A is provided with a through hole in a lateral direction in the figure, wherein each one end of each of the metallic powder supplying pipes 14 and 15 with an outer diameter of a little longer than 4 mm is press fitted and fixed. The aforesaid through hole in the horn part 7A is provided with stepped parts indicated by reference numerals 7B and 7C in FIG. 7 in order to make an accurate position setting for the press fitting end of each of the supplying pipes 14 and 15. Both supplying pipes 14 and 15 are press fitted into the through hole in the horn part 7A in such a way that each of the end parts of the supplying pipes 14 and 15 may be abutted against these stepped parts 7B and 7C.

Figure 7:
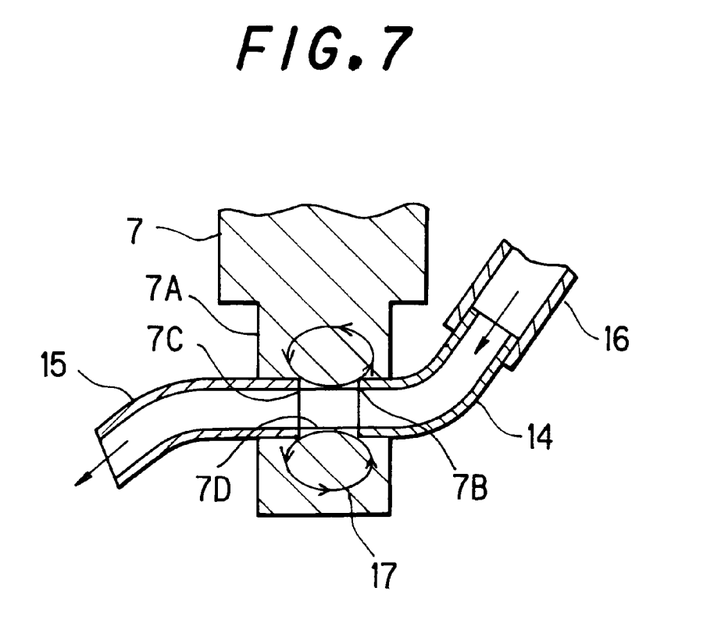
FIG. 7 is a partial enlarged view.

Accordingly, a central part of the through hole of the horn part 7A forms a small diameter part indicated by a reference numeral 7D in FIG. 7, wherein an inner diameter of this small diameter part 7D and an inner diameter of each of both supplying pipes 14 and 15 are set to the same inner diameter of ø 3.5 mm.

A part between an inlet of one powder supplying pipe 14 and a lower end outlet of the aforesaid powder hopper 1 is connected by a Teflon tube 16.

The ultrasonic motor 5 is operated such that the piezo-electric elements 8 and 10 may produce a non-symmetrical elongation by applying an AC voltage of about 30 kHz between the terminals 9C and 11C, a primary extending or retracting vibration (a vertical vibration) and a secondary flex vibration (a flex vibration) are generated concurrently, a motion having these two vibrations complexed to each other is generated, at the horn part 7A of the extremity end having the largest amplitude is produced a rotary vibration showing an elliptical orbit with the vertical amplitude and the lateral amplitude being applied as a minor diameter and a major diameter, respectively.

A driving frequency of 30 kHz is set to a frequency resonant to a primary extending or retracting vibration and a secondary flex vibration of the ultrasonic motor 5, and a shape of the motor is set to such a shape as one in which it may generate a rotary vibration drawing the aforesaid elliptical orbit in reference to the resonant frequency.

Figure 5:
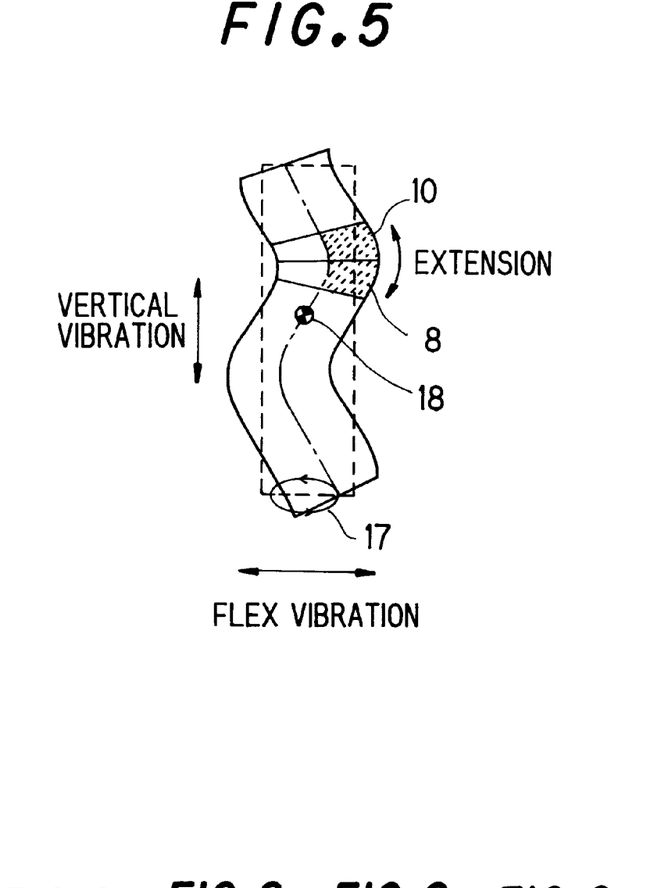
FIG. 5 is an illustrative view for showing a vibration mode of an ultrasonic vibrator used in the preferred embodiment of the present invention.
Figure 6:
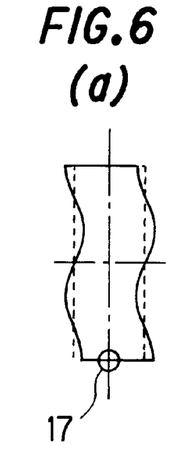
FIGS. 6(a) to 6(d) are illustrative views each showing a variation in time in a vibration mode.

FIG. 5 shows in an exaggerated form a state in which the extremity end (a lower end as viewed in the figure) may produce an elliptical orbit indicated by a reference numeral 17 under a complex state of the vertical vibration and the flex vibration. In addition, FIGS. 6(a), 6(b), 6(c) and 6(d) illustrate an exploded step for generating a rotary vibration of the elliptical orbit under a complex formation of both vibrations during one period of the driving voltage.

In FIG. 5 and FIGS. 6(a) to 6(d) the horn part 7A for use in expanding an amplitude of the lower end (extremity end) of the motor is eliminated for its illustration. In FIG. 5, a reference numeral 18 shows a section point which may act as a common point for both a primary vertical vibration and a secondary flex vibration, wherein the fixed part 13b of the aforesaid supporting shaft 13 is arranged in compliance with the position of this common section, whereby an efficiency of the ultrasonic motor can be set to the best efficiency.

In this case, the elliptical orbit 17 of the horn part 17A is operated such that the powder supplying pipes 14, 15 and the powder in the small diameter part 7D press contacted with the pipe and the surface of the small diameter part using gravity are driven through friction caused by vibration so as to be promoted from the pipe 14 toward the pipe 15 as indicated by an arrow in FIG. 7.

Figure 8:
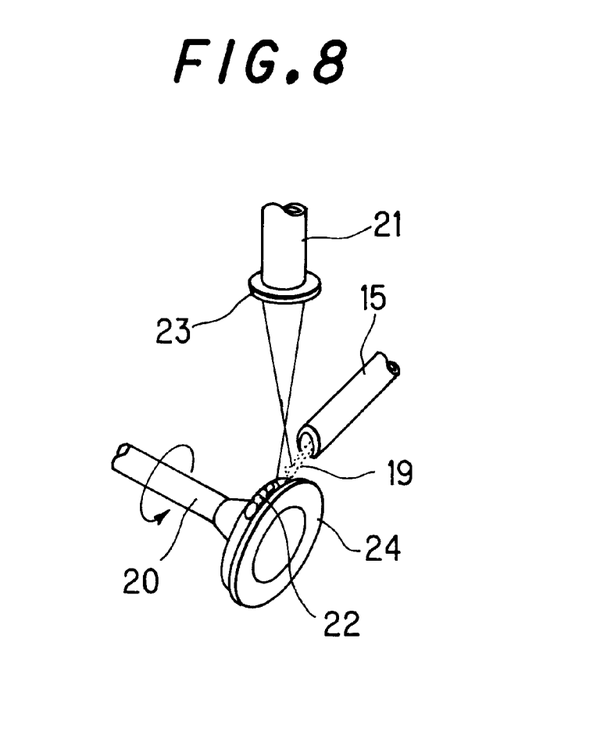
FIG. 8 is a perspective view for illustrating an overlaying process for an engine valve in the preferred embodiment of the present invention.
Figure 9:
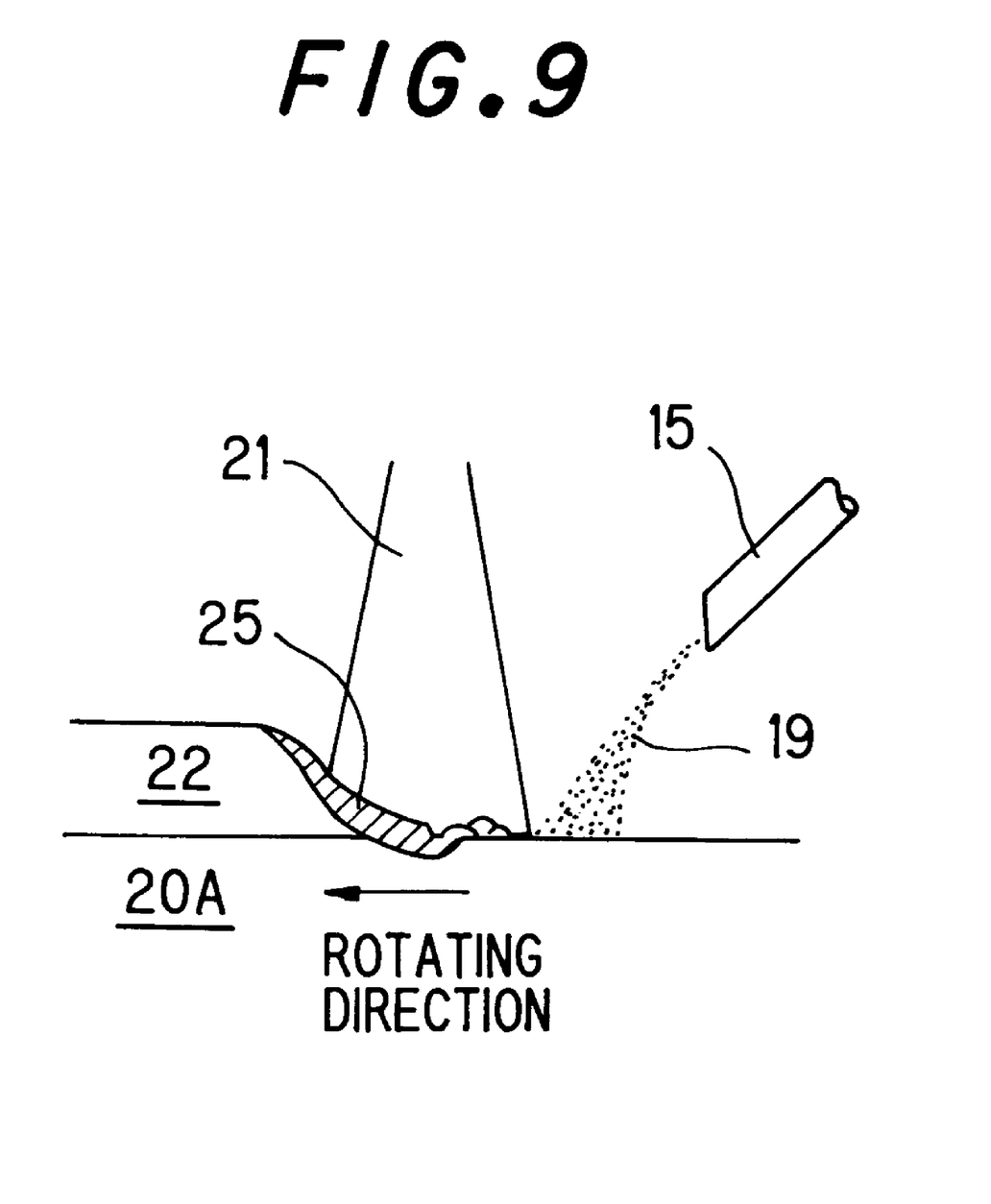
FIG. 9 is a sectional enlarged view of overlay for showing an overlaying process.

In this way, the powder 19 for overlaying supplied from the powder supplying pipe 15 is supplied to an outer circumferential groove of the rotating engine valve 20 as indicated in FIGS. 8 and 9, welded by a laser beam 21 so as to construct an overlaying layer 22. Reference numeral 23 is a light collecting lens, reference numeral 24 indicates a cap of an engine valve, reference numeral 25 indicates a molten pond and reference numeral 20A indicates a mother material.

Figure 1:
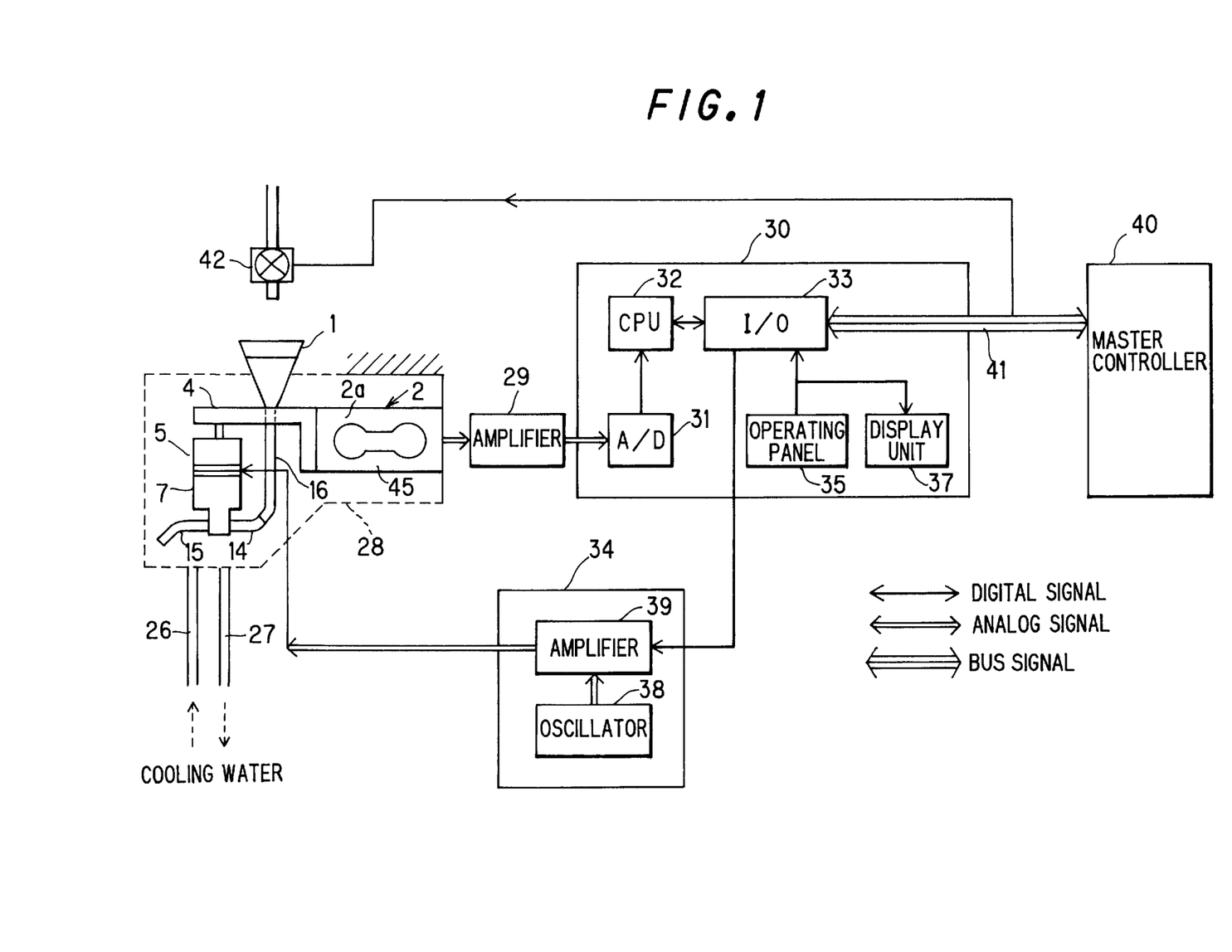
FIG. 1 is a schematic view for showing a preferred embodiment of the present invention.
Figure 2:
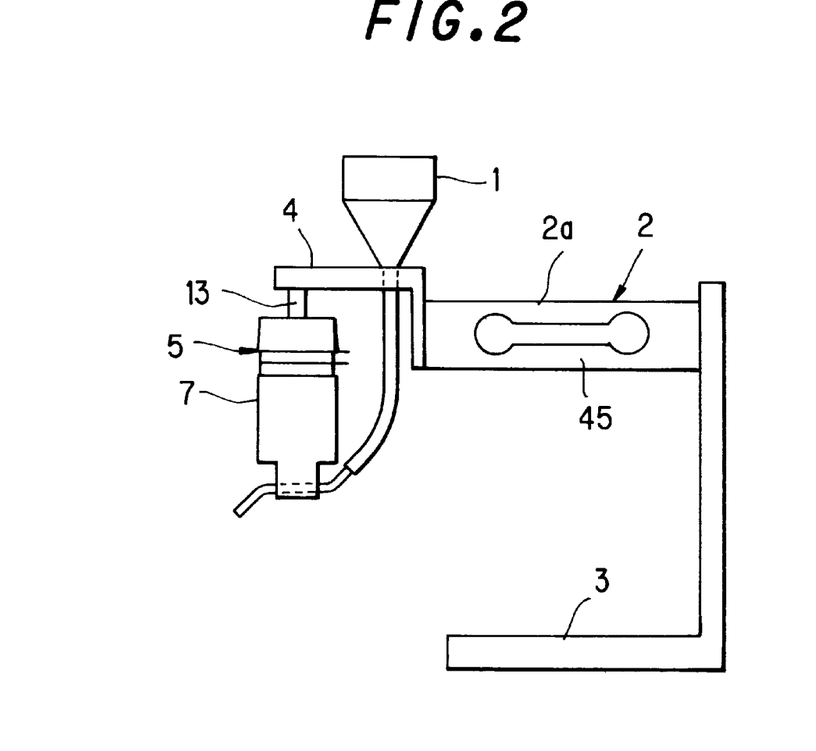
FIG. 2 is a front elevational view for showing a mechanism part of a powder supplying device applied in the preferred embodiment shown in FIG. 1.

In FIG. 1, a part where powder for overlaying is supplied to an outer circumferential groove of the aforesaid engine valve by the supplying pipe 15 is formed with a supplying head not shown, and cooling water is passed to the supplying head through passages indicated by reference numerals 26 and 27. In addition, a vibratory feeder part is covered with a cooling cover 28.

An analog signal from the weight sensor of the weighing device 2 is amplified by the amplifier 29 and sampled in A/D converter of a module controller 30 to be converted into a digital signal. The weight signal converted into a digital signal is processed by CPU 32 so as to calculate a flow rate of powder per unit hour. Then, a driving electric power for the ultrasonic motor 5 is adjusted through an I/O interface 33 or the motor driving part 34 and feed-back controlled in such a way that the flow rate of powder is coincided with the set value (a target value).

A flow rate setting is carried out by an operating panel 35 of the module controller 30. An abnormal state detected by CPU 32 or a flow rate setting value or the like is displayed at a displaying device 37.

The motor driving part 34 comprises an AC signal oscillator 38 of 30 kHz and an amplifier 39 for amplifying an output of the AC signal oscillator 38. Reference numeral 40 denotes a master controller for controlling a supplying, a supplementing and an abnormal detection of an entire system, and reference numeral 41 denotes a controlling bus. Reference numeral 42 denotes a supplementing valve for supplementing powder to the powder hopper 1.

Figure 10:
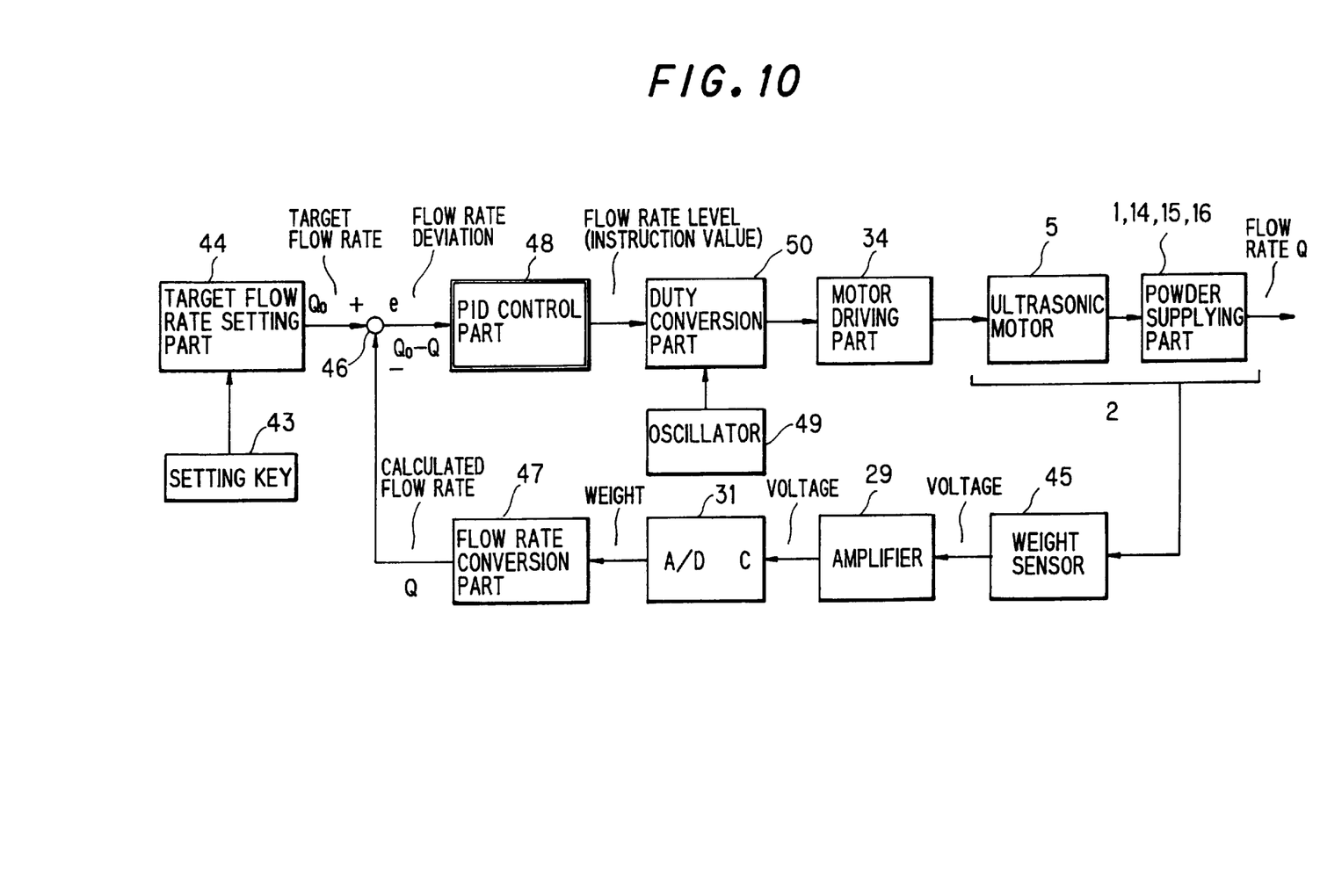
FIG. 10 is a block diagram for showing the preferred embodiment shown in FIG. 1.
Figure 11:
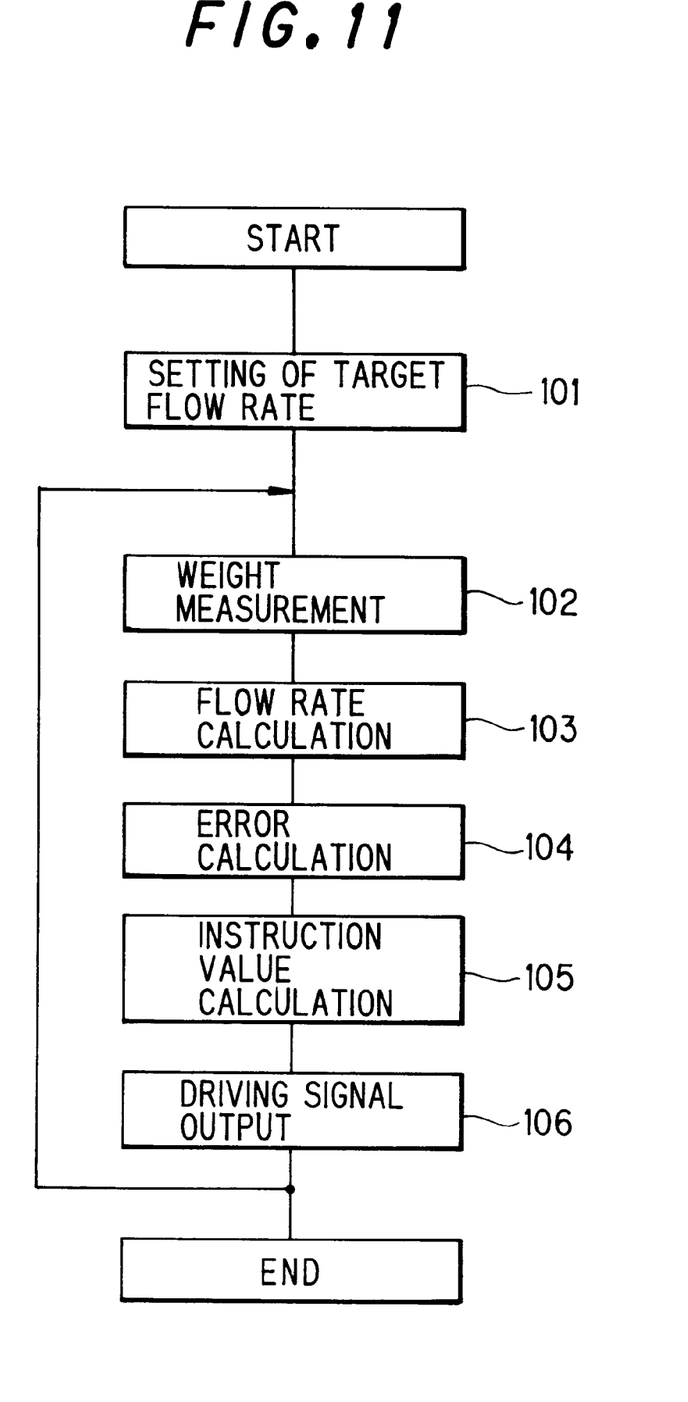
FIG. 11 is a flow chart for illustrating a flow of the block diagram shown in FIG. 10.

Referring to FIGS. 10 and 11, a procedure of the feed-back control for a flow rate of powder will be described in detail.

A setting key 43 of the operating panel 35 is operated to set a target flow rate $Q_0$ to a target flow rate setting part 44 (a step 101).

Figure 13:
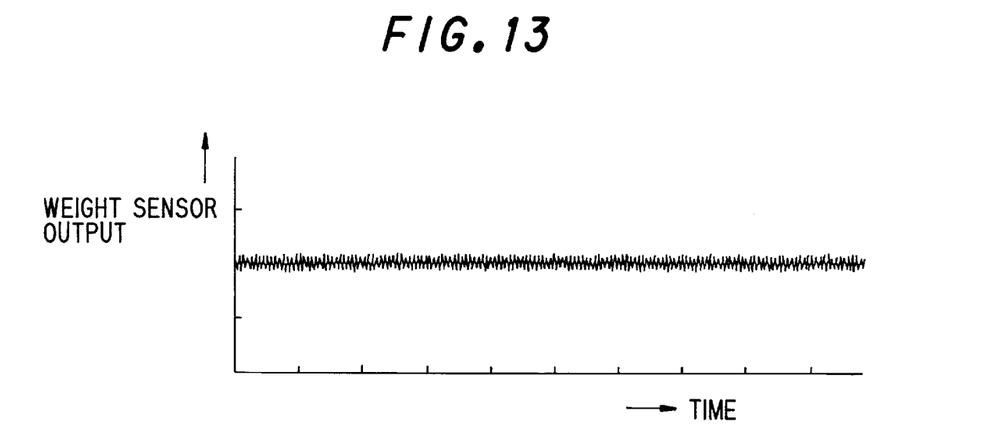
FIG. 13 is a diagram for showing a wave-form of a weight sensor output of the preferred embodiment of the present invention.

An analog signal of the weight sensor 45 of the aforesaid weighing device 2 is amplified by the amplifier 29. An analog voltage acting as an output signal of the weight sensor 45 has a noise of about 30 kHz corresponding to the driving frequency of the ultrasonic motor as shown in FIG. 13, so that an input part of the amplifier 29 is provided with a low-pass filter (not shown) removing this noise.

Then, an output signal of the amplifier 29 is sampled by an A/D converter 31 to convert it into a digital value, a mean value of a plurality of (n) number of data sampled in a continuous manner is calculated to make a smooth value and at the same time it is stored and held as a present value Gn (a step 102).

Then, a mean value Ga of the sampled data of the number of (n) after this operation is calculated to calculate a flow rate Q by applying a time difference Δt between the present time and the previous step 102 (a step 103). A calculation of the flow rate Q is carried out at the flow rate converting part 47.

$$Q = (Ga - Gn)/\Delta t \ [g/s]$$

Then, a flow rate difference (error) e is calculated by a subtracter 46 (a step 104).

$$e = Q_0 - Q$$

A flow rate difference e is inputted to a PID control part 48 of a transmission function G (S) so as to attain an instruction value K=G(S)·e (a step 105).

A driving signal for the ultrasonic motor is outputted in response to this instruction value K (a step 106).

Reference numeral 49 denotes a square wave oscillator with a frequency of 200 Hz, wherein its duty is converted at a duty conversion part 50 in response to an output instruction value K of the aforesaid PID control part 48.

A driving signal of 30 kHz at the motor driving part 34 is turned ON or OFF with a square wave signal of 200 Hz at the duty conversion part 50, resulting in that a mean driving electrical power of the ultrasonic motor 5 is adjusted in response to a duty of the square wave of 200 Hz, a vibrating amplitude of the ultrasonic motor is controlled, and a flow rate of the powder flowed from the supplying pipe 15 is feed-back controlled to $Q_0$ of the target set value.

In the preferred embodiment shown in the figure, a smoothing with a mean value of the number of (n) at the steps 102 and 103 is carried out with a mean value of ten data. In addition, a calculation of the flow rate Q at the flow rate converting part 47 is attained by calculating the mean values of twice to three times.

The number of times of this twice or three times or the value of the aforesaid (n) is varied in its suitable value in response to a nature of the powder or a set (target) flow rate, so that the operating panel 35 of the module controller 30 shown in FIG. 1 is operated to make a proper setting.

Figure 12:
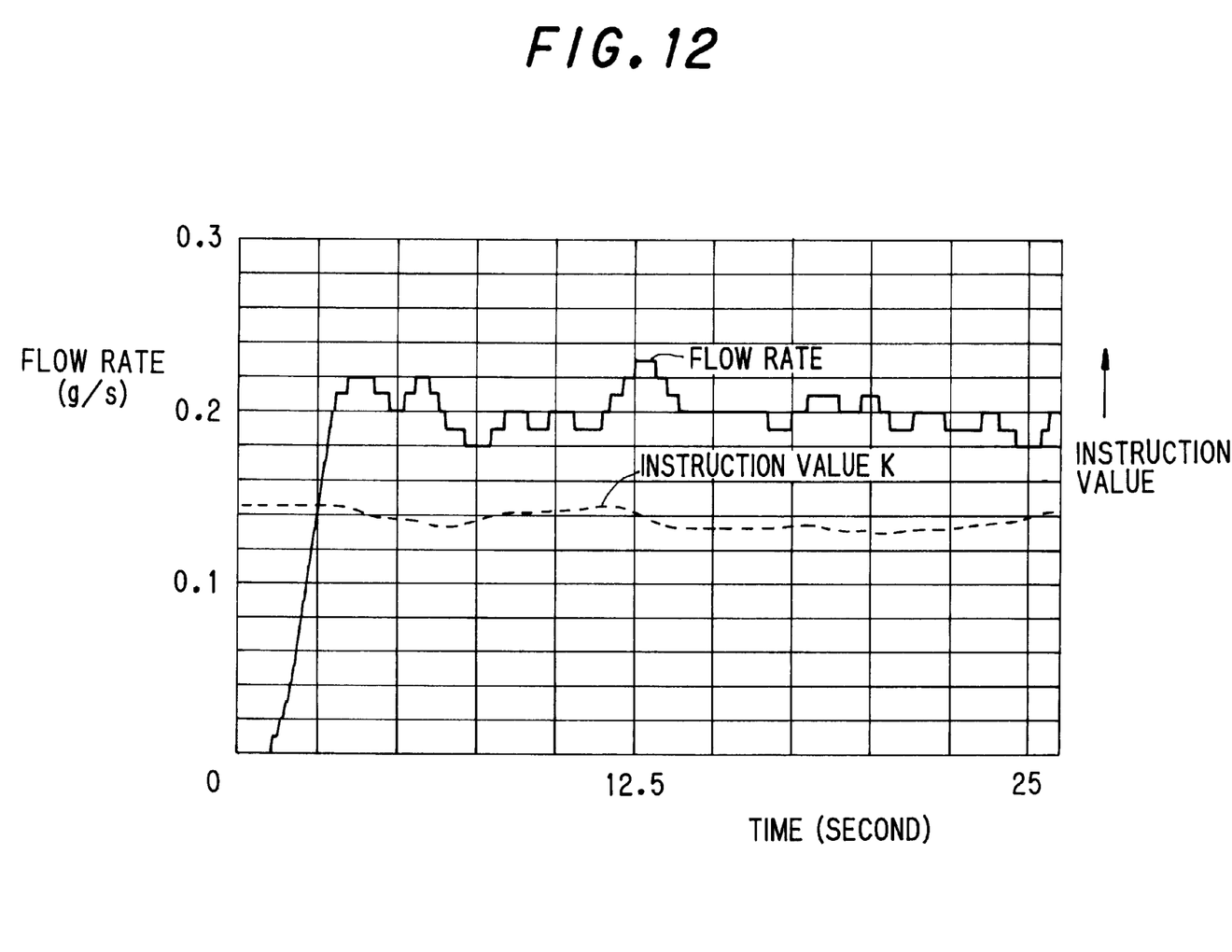
FIG. 12 is a diagram for indicating a variation in time between an instruction value and a flow rate of the preferred embodiment of the present invention.

An example of an instruction value (duty) and a flow rate when the target flow rate $Q_0$ in the aforesaid preferred embodiment is set to 0.2 [g/s] is shown in FIG. 12. In this case, a flow rate in FIG. 12 is not a calculated value obtained through the actual measurement at the weight sensor 45 in the weighing device 2, but one in which the supplying flow rate of the powder is measured under a separate application of a flow meter not shown.

As described above, in the preferred embodiment of the present invention, noise caused by the mechanical vibration of the output of the weight sensor is a small amplitude as shown in FIG. 13, and its frequency is a high frequency caused by an ultrasonic vibration, resulting in that noise can be completely removed with a low pass filter arranged at an input part of the amplifier 29.

Figure 14:
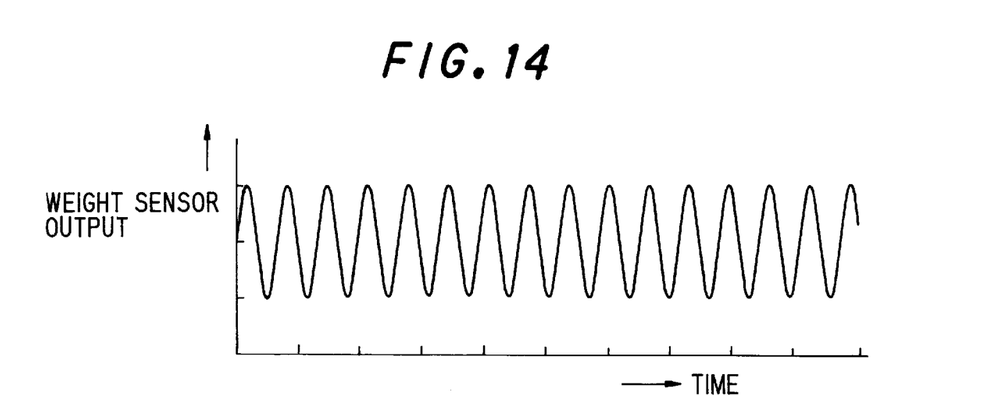
FIG. 14 is a diagram for showing a wave-form of the prior art weight sensor output.

In the case that the prior art electromagnetic feeder is applied, noise admixed to an output of the weight sensor caused by a mechanical vibration as shown in FIG. 14 has a large amplitude and its frequency is small, so it is hard to eliminate its adverse effect.

In the aforesaid preferred embodiment, in the case that a particle diameter of the powder was 100 μm and a few rate range was set to 0.05 to 2.00 [g/s], a flow rate accuracy had a mean value of ±2% and its responding time could be set to about 0.2 second. Due to this fact, metallic powder used in an overlaying at the engine valve could be approached to a requisite powder amount pattern as much as possible under a reduction of amount of margin caused by stabilized flow rate and an improvement of flow rate controlling characteristic caused by an increased supply responding characteristic and an amount of use of the powder could be reduced by an amount of 10% or more as compared with that of the case in which the prior art rotary feeder was applied. In addition, a weight of the main body of the ultrasonic feeder could be realized to be light in 250 g.

Since the powder supplying device of the present invention is constructed as described above and the number of vibration of the ultrasonic motor is high, so a noise of the weight signal can be easily reduced without deteriorating a sensing accuracy of the weight sensor. In addition, since a sampling frequency of the A/D converting part can be increased, not only the high precision setting of the supplying of flow rate in the powder supplying device of low flow rate can be realized, but also a loss of amount of use of the powder can be reduced in view of improved responding characteristic and it may contribute to a cost reduction of the engine valve. Further, the present invention has an advantage that a powder supplying device of small flow rate can be made small in size and light in weight.

What is claimed is:

1. A powder supplying device comprising a powder hopper, supplying pipes for guiding powder from said powder hopper and an ultrasonic motor for applying an elliptical vibration to the powder in the supplying pipes, and a weighing device supporting the supplying pipes and wherein:

said ultrasonic motor is constructed such that a first piezoelectric element, divided electrodes, a second piezoelectric element, and a ground electrode are held between substantially circular cylindrical aluminum blocks, and a hollow connecting bolt connects said aluminum blocks;

the lower aluminum block of said ultrasonic motor is provided with a through hole in a substantially lateral direction, both ends of said supplying pipes for guiding powder are connected to said through hole and one end of one of said supplying pipes for guiding powder from said hopper is connected to said powder hopper; and a flow rate of powder is calculated is based upon a reducing amount of weight per hour measured by a weight sensor of the weighing device; and a driving electric power signal applied to the terminals of the ultrasonic motor is adjusted such that a supplying flow of the powder is feedback controlled to a target value in response to a duty of a square wave by a duty conversion part.

2. A powder supplying device as set forth in claim 1, wherein different kinds of metal powders which are used for overlay fusing with a laser clad in a manufacturing step for an engine valve of an automobile is received in said powder hopper and the powder for overlaying is supplied through said supplying pipes continuously to a groove at a circumference of the valve.

* * * * *